US010077400B2

(12) United States Patent
Chaieb et al.

(10) Patent No.: US 10,077,400 B2
(45) Date of Patent: Sep. 18, 2018

(54) COLLOIDAL SUSPENSION OF PHOTOLUMINESCENT AMORPHOUS POROUS SILICON, METHODS OF MAKING COLLOIDAL SUSPENSION OF PHOTOLUMINESCENT AMORPHOUS POROUS SILICON, AND METHODS OF USING COLLOIDAL SUSPENSION OF PHOTOMIMUNESCENT AMORPHOUS POROUS SILICON

(71) Applicant: King Abdullah University of Science and Technology, Thuwal (SA)

(72) Inventors: Sahraoui Chaieb, Urbana, IL (US); Asad Mughal, Moorestown, NJ (US)

(73) Assignee: KING ABDULLAH UNIVERSITY OF SCIENCE AND TECHNOLOGY (KAUST), Thuwal (SA)

( * ) Notice: Subject to any disclaimer, the term of this patent is extended or adjusted under 35 U.S.C. 154(b) by 396 days.

(21) Appl. No.: 14/396,791

(22) PCT Filed: Apr. 25, 2013

(86) PCT No.: PCT/US2013/038201
§ 371 (c)(1),
(2) Date: Oct. 24, 2014

(87) PCT Pub. No.: WO2013/163417
PCT Pub. Date: Oct. 31, 2013

(65) Prior Publication Data
US 2015/0097143 A1 Apr. 9, 2015

Related U.S. Application Data

(60) Provisional application No. 61/638,574, filed on Apr. 26, 2012.

(51) Int. Cl.
*C09K 11/59* (2006.01)
*C09K 11/02* (2006.01)

(52) U.S. Cl.
CPC .............. *C09K 11/59* (2013.01); *C09K 11/02* (2013.01); *C09K 11/025* (2013.01)

(58) Field of Classification Search
CPC ........ C09K 11/59; C09K 11/02; C09K 11/025
See application file for complete search history.

(56) References Cited

U.S. PATENT DOCUMENTS

| 6,710,366 | B1 * | 3/2004 | Lee ........................ | B82Y 10/00 257/103 |
| 6,743,406 | B2 * | 6/2004 | Nayfeh ................... | B82Y 30/00 205/656 |
| 2004/0197255 | A1 | 10/2004 | Nayfeh et al. | |
| 2004/0229447 | A1 * | 11/2004 | Swihart ................. | C01B 33/027 438/507 |
| 2008/0102036 | A1 * | 5/2008 | Poss .................... | A61K 49/0017 424/9.6 |
| 2010/0278931 | A1 | 11/2010 | Ashton et al. | |
| 2011/0266521 | A1 | 11/2011 | Ferrari et al. | |

FOREIGN PATENT DOCUMENTS

WO WO2005017951 A2 2/2005

OTHER PUBLICATIONS

"Nanotechnology: New Name, Old Science", Technial Brief 2011, vol. 8.*
Credo et al, "External quantum efficiency of single porous silicon nanoparticles", Applied Physics Letters, vol. 74, No. 14, Apr. 5, 1999, pp. 1978-1980.*
Supplementary European Search Report for EP Application No. 13781912A based on PCT/US2013/038201 dated Jan. 11, 2016. (5 pages).
International Search Report and Written Opinion of Application No. PCT/US2013/038201 dated Sep. 9, 2013, 9 pages.
European Office Action, dated Jul. 9, 2018, from corresponding European Application No. 13 781 912.4-1105.

* cited by examiner

*Primary Examiner* — Carol M Koslow
(74) *Attorney, Agent, or Firm* — Patent Portfolio Builders PLLC

(57) ABSTRACT

A method of making a colloidal suspension of photoluminescent porous silicon particles involves removing a layer of porous silicon from a substrate using a first ultrasound energy to form a first plurality of porous silicon particles in a colloidal suspension. The first plurality of porous silicon particles in the colloidal suspension are exposed to a second ultrasound energy to reduce the size of the first plurality of porous silicon particles in the colloidal suspension, thereby forming a second plurality of porous silicon particles in a colloidal suspension, wherein the second plurality of porous silicon particles are in the amorphous phase.

11 Claims, 11 Drawing Sheets

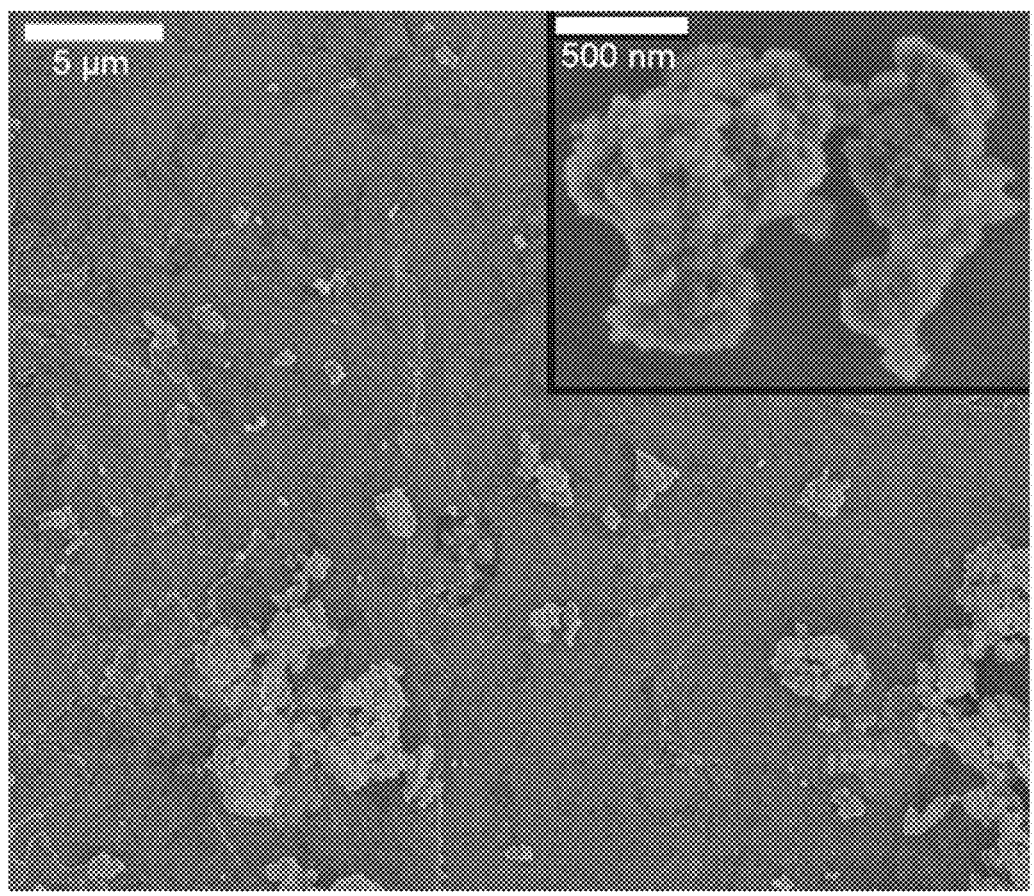
FIG. 1.1a

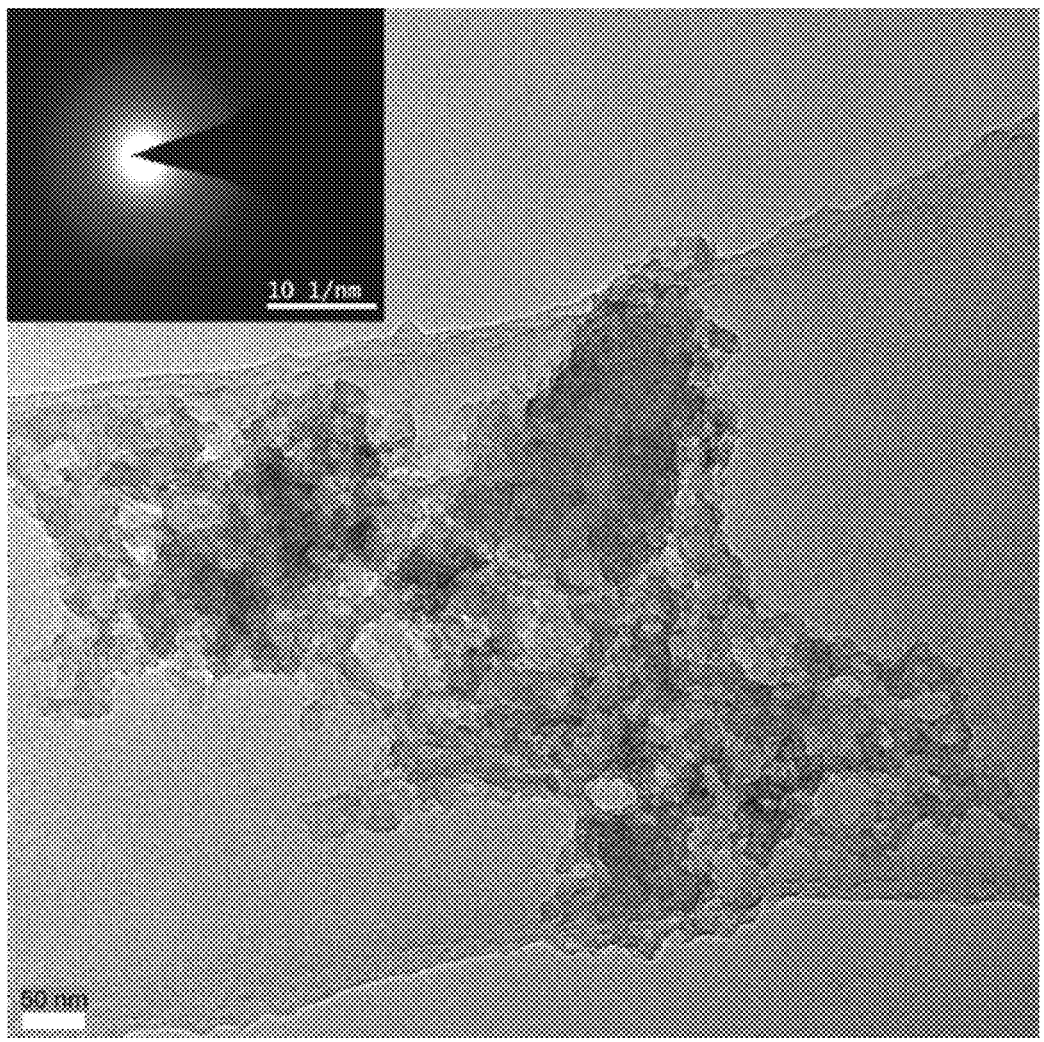
FIG. 1.1b

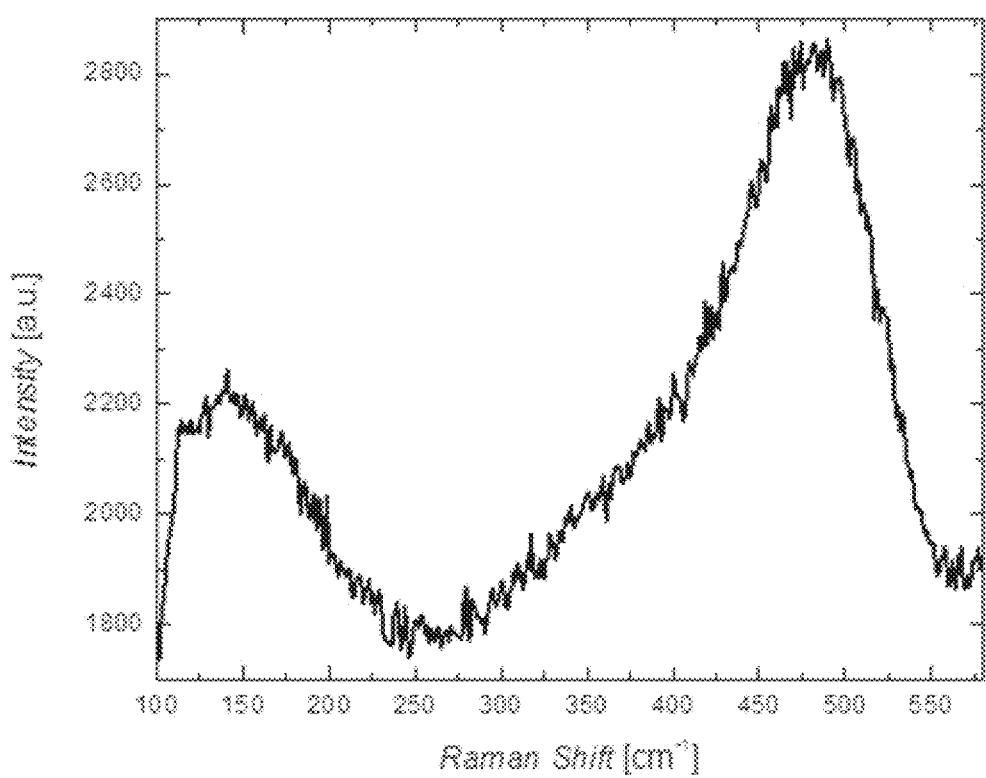
FIG. 1.1c

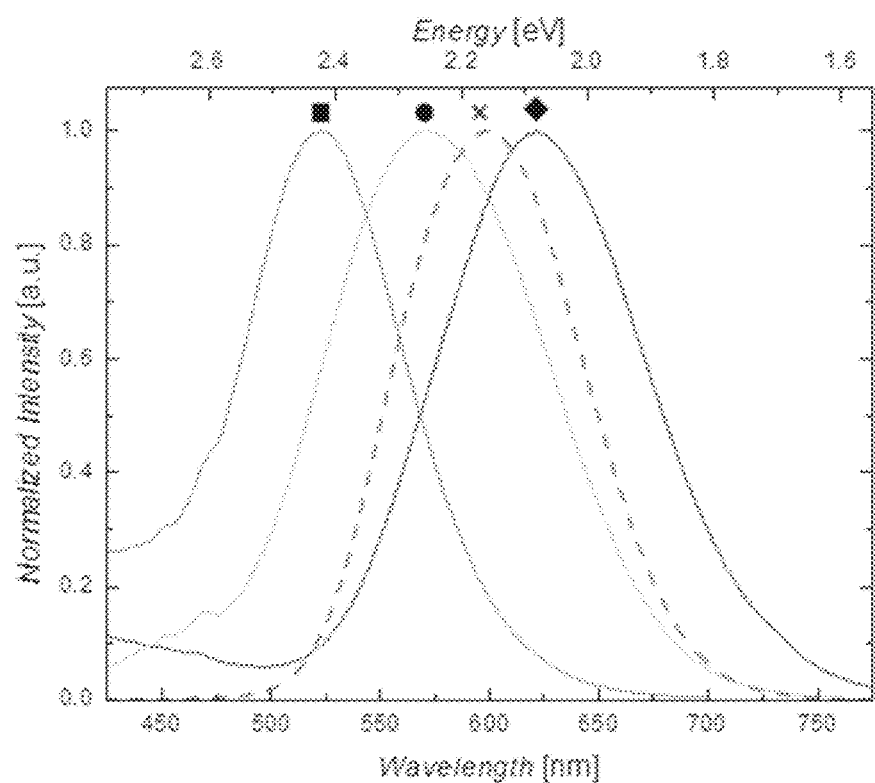
FIG. 1.2a
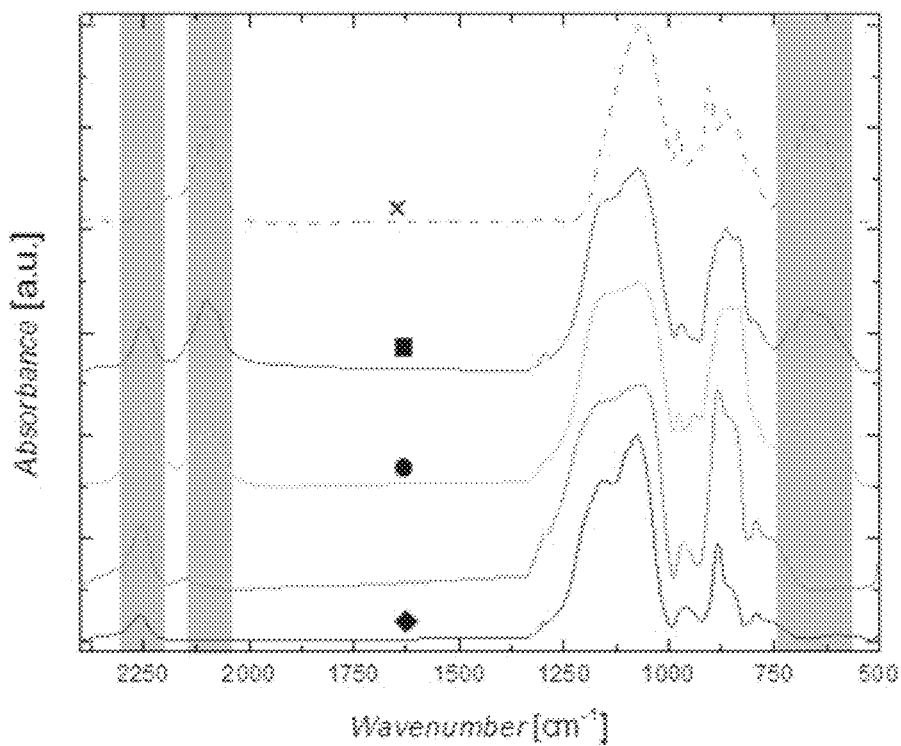
FIG. 1.2b

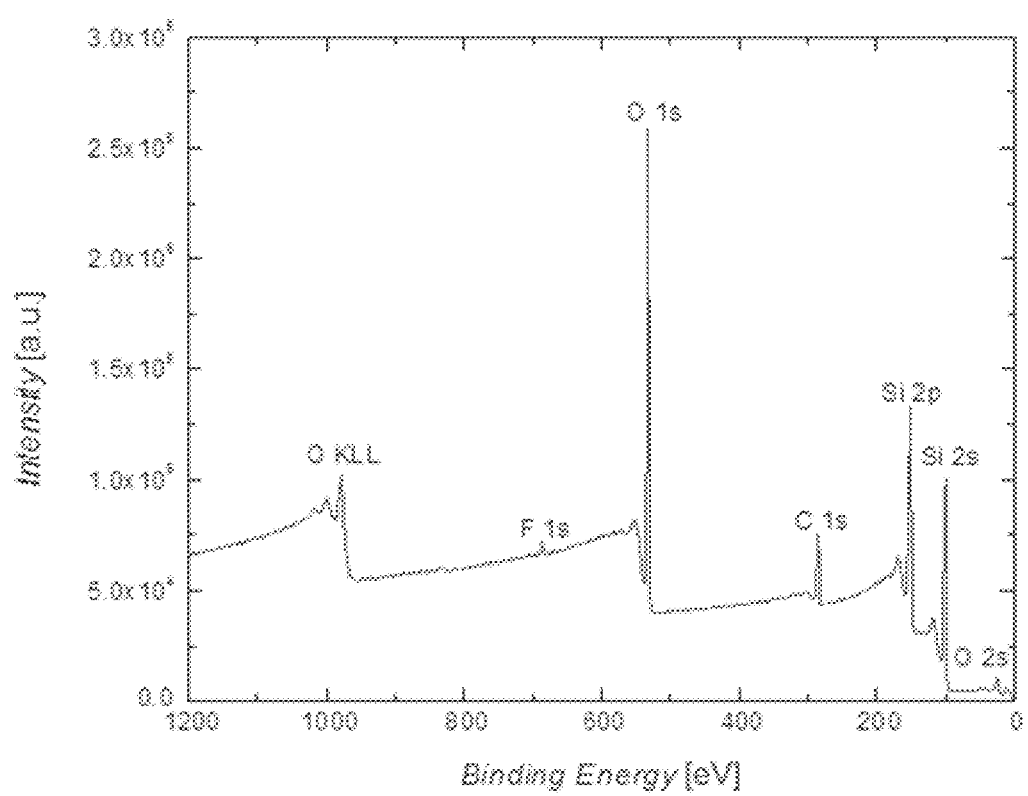
FIG. 1.3

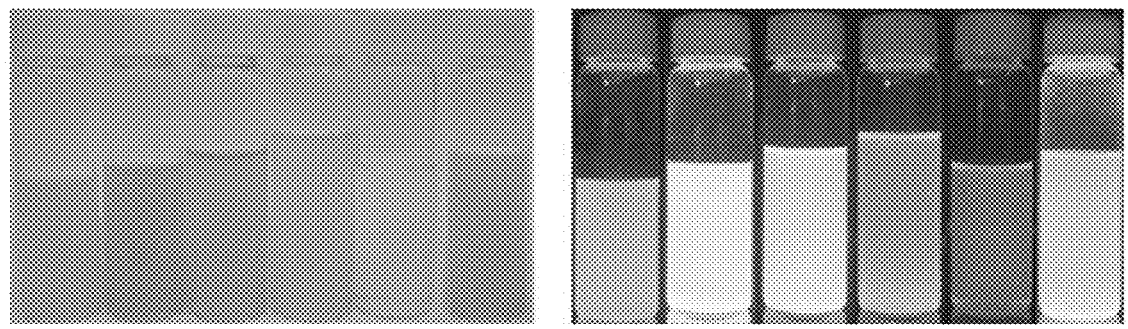
FIG. 1.4
ap-Si suspensions under white light (left) and UV 365nm light (right)
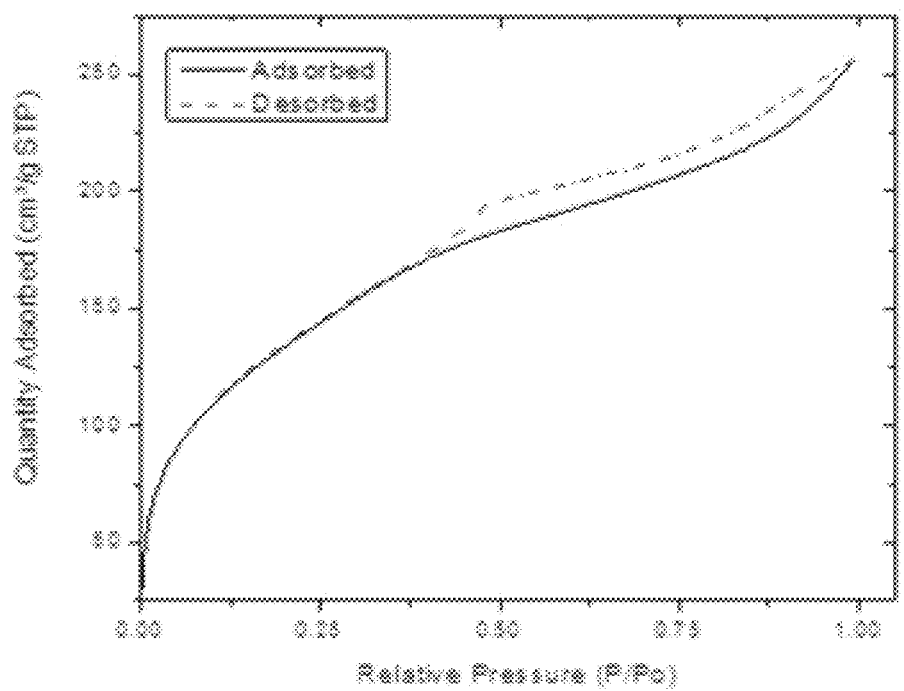
FIG. 1.5a
BET porosimetry measurements on ap-Si

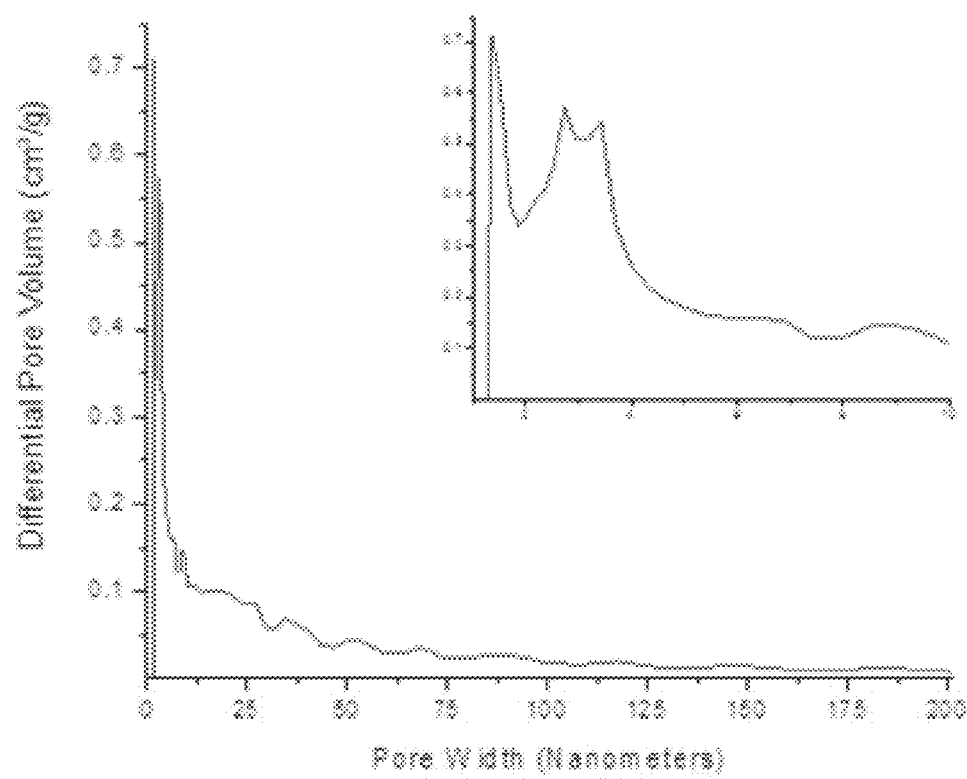
FIG. 1.5b
BET porosimetry measurements on ap-Si

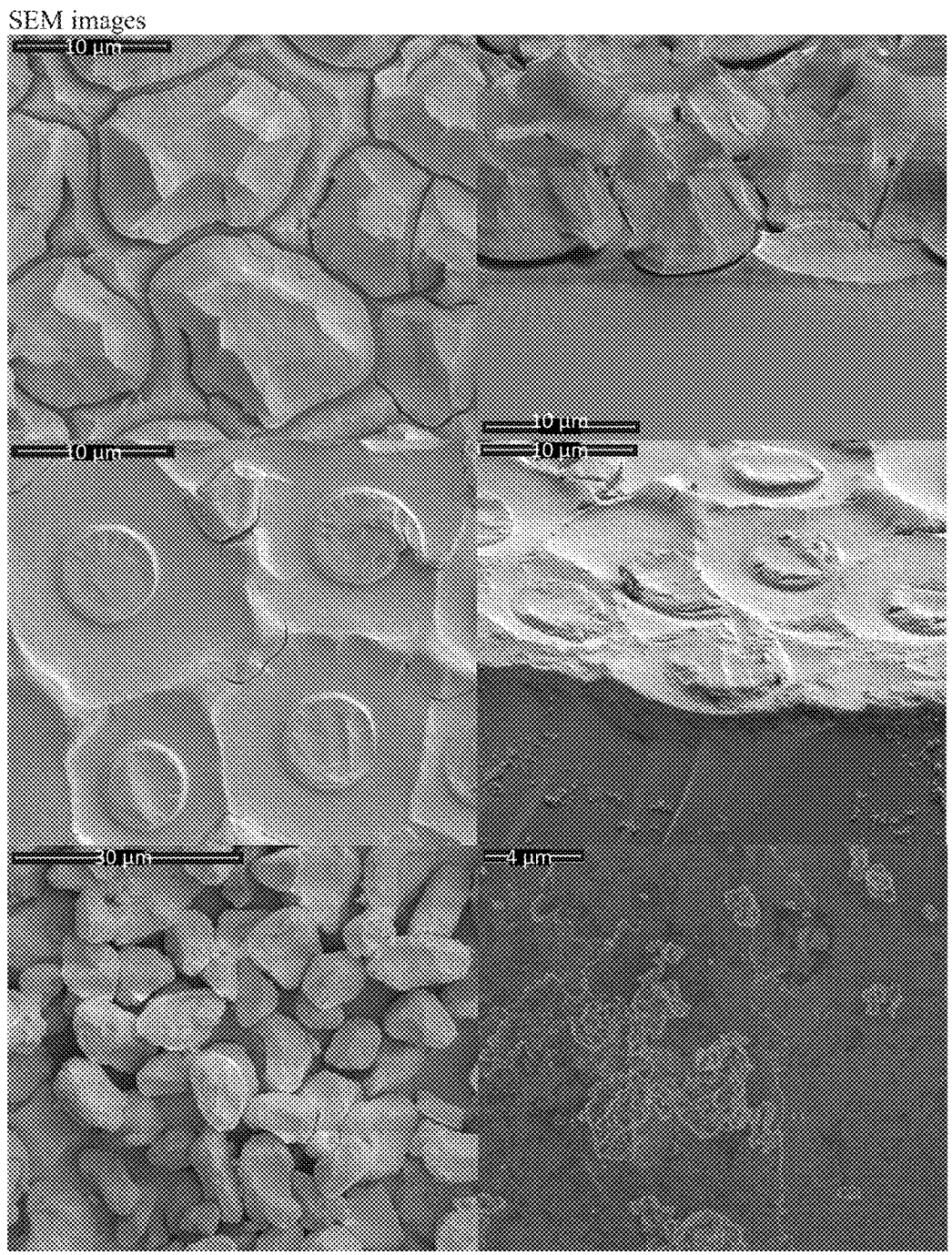
Figure. SEM images of etched Si wafer, before sonication, after sonication, ap-Si granules and ap-Si after probe sonication
FIG. 1.6

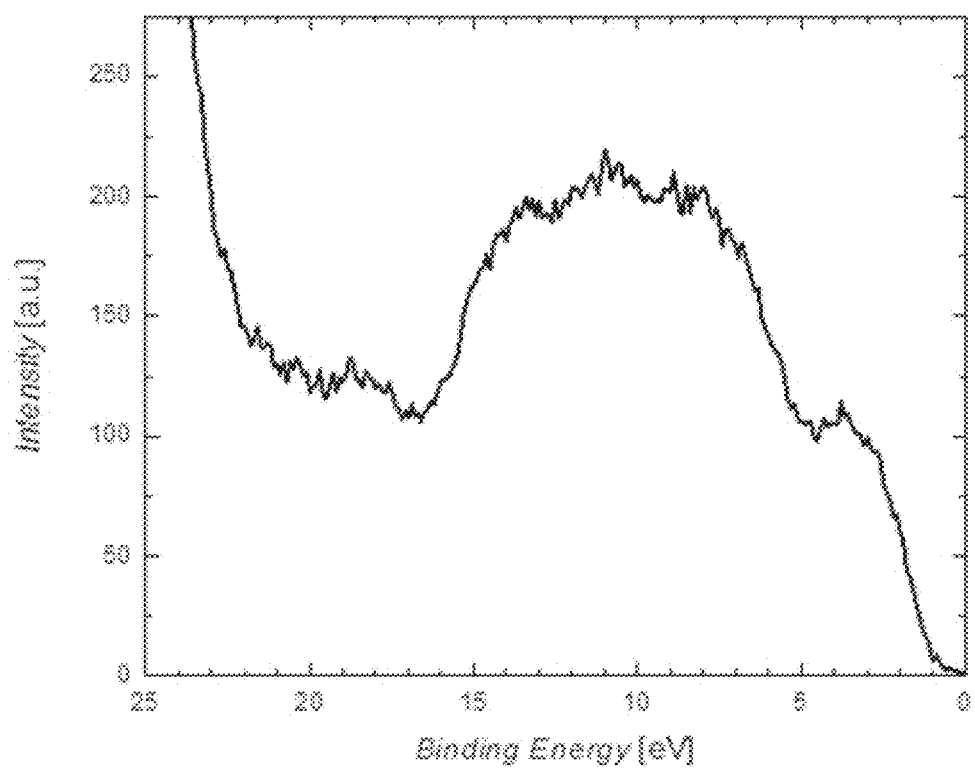
FIG. 1.7
XPS valence band spectra with peaks near 3, 7.5, 10 and 14 eV
XPS valance-band spectra further confirm the existence of an amorphous phase.
The broad peak between 5 and 15eV is due to the presence of odd-membered rings
of Si atoms in addition to the six-membered rings that compose crystalline Si

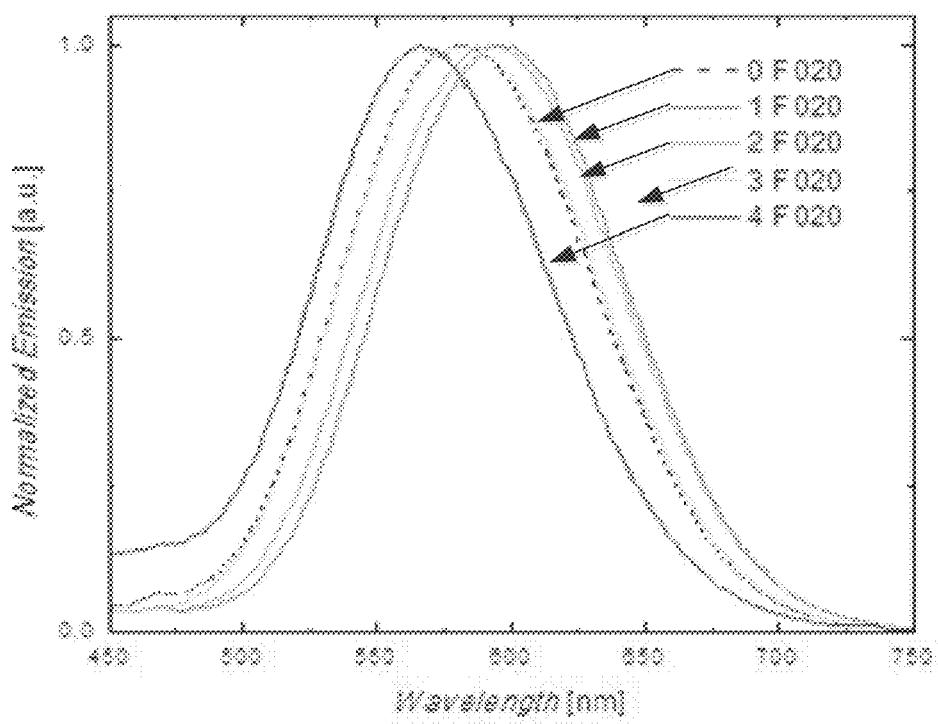
FIG. 2.1
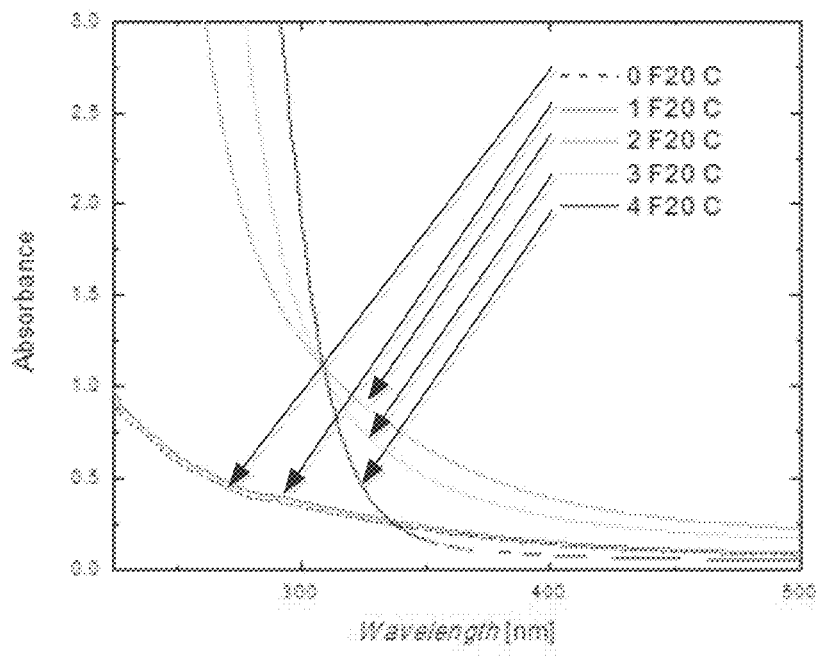
FIG. 2.2

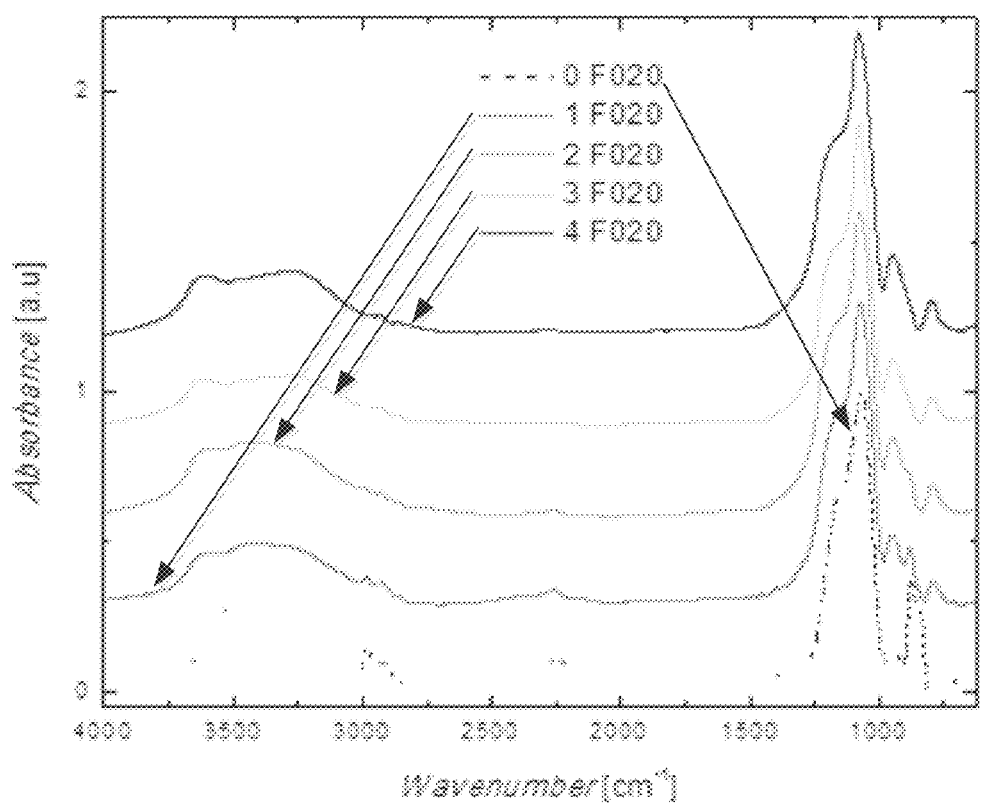
FIG. 2.3

COLLOIDAL SUSPENSION OF PHOTOLUMINESCENT AMORPHOUS POROUS SILICON, METHODS OF MAKING COLLOIDAL SUSPENSION OF PHOTOLUMINESCENT AMORPHOUS POROUS SILICON, AND METHODS OF USING COLLOIDAL SUSPENSION OF PHOTOMIMUNESCENT AMORPHOUS POROUS SILICON

CROSS REFERENCE TO RELATED APPLICATIONS

This application is the National Stage of International Application No. PCT/US2013/038201, filed 25 Apr. 2013, which claims the benefit of and priority to U.S. provisional application entitled "COLLOIDAL PHOTOLUMINESCENT AMORPHOUS POROUS SILICON, METHODS OF MAKING COLLOIDAL PHOTOLUMINESCENT AMORPHOUS POROUS SILICON, AND METHODS OF USING COLLOIDAL PHOTOLUMINESCENT AMORPHOUS POROUS SILICON" having Ser. No. 61/638,574, filed on 26 Apr. 2012, the contents of all of which are incorporated by reference as if fully set forth herein.

BACKGROUND

Transforming bulk Si into the nanometer scale results in efficient room temperature emission of visible light. One extensively studied variant of nano-scaled Si is porous Si (p-Si). Porous features are normally created in bulk Si through some type of electrochemical etching technique. Quantum confinement effects and surface effects control the electronic and optical properties of this material. p-Si is an interesting material for both the viewpoints of fundamental physics and device applications. Although much is known about this material, the exact origin of light emission is still a topic of debate in the literature.

SUMMARY

In accordance with the purpose(s) of the present disclosure, as embodied and broadly described herein, embodiments of the present disclosure, in one aspect, relate to a colloidal photoluminescent amorphous porous silicon particle suspension, methods of making a colloidal photoluminescent amorphous porous silicon particle suspension, methods of using a colloidal photoluminescent amorphous porous silicon particle suspension, and the like.

In an embodiment, a method of making a colloidal photoluminescent porous silicon particle suspension, among others, includes: removing a layer of porous silicon from a substrate using a first ultrasound energy to form a first plurality of porous silicon particles in a colloidal suspension; and exposing the first plurality of porous silicon particles to a second ultrasound energy to form a second plurality of porous silicon particles in suspension, wherein the second plurality of porous silicon particles are in the amorphous phase. In an aspect, the second plurality of porous silicon particles have a longest dimension of about 100 nanometers to 10 micrometers and/or are irregularly shaped.

In any one or more aspects, the second plurality of porous silicon particles are suspended in a solvent selected from the group consisting of: ethanol, toluene, hydrogen peroxide, water, THF, isopropylene, octane, an alkane solvent, and a combination thereof. For example, the second plurality of porous silicon particles may be suspended in ethanol and have an emission of about 523 nm just after formation of the suspension, may be suspended in ethanol and have an emission of about 622 nm after about one month, may be suspended in toluene and have an emission of about 598 nm just after formation of the suspension, or may be suspended in hydrogen peroxide and have an emission of about 595 nm to 566 nm.

In an embodiment, a photoluminescent porous silicon particle suspension, among others, includes: a plurality of porous silicon particles in a solvent, and wherein the plurality of porous silicon particles is in the amorphous phase. In an aspect the plurality of porous silicon particles in the suspension may have a longest dimension of about 100 to 500 nanometers and/or are irregularly shaped. In any one or more aspects the solvent in which the photoluminescent porous silicon particle are suspended is selected from the group consisting of: ethanol, toluene, hydrogen peroxide, water, THF, isopropylene, octane, an alkane solvent, and a combination thereof. For example, the plurality of porous silicon particles may be suspended in ethanol and have an emission of about 523 nm just after formation of the suspension, may be suspended in ethanol and have an emission of about 622 nm after about one month, may be suspended in toluene and have an emission of about 598 nm just after formation of the suspension, or may be suspended in hydrogen peroxide and have an emission of about 595 nm to 566 nm. In any one or more aspects the plurality of porous silicon particles may have a ratio of OH to H of about 1:0 to 5:0.

Other structures, compositions, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1.1a illustrates that the sonicated ap-Si particles range in size between hundreds of nanometers to several microns.

FIG. 1.1b illustrates a HRTEM image of one ap-Si particles

FIG. 1.1c illustrates the phase transformation.

FIG. 1.2a illustrates the fluorescence spectrums of two samples, while the corresponding FT-IR absorbance spectra are shown in FIG. 1.2b.

FIG. 1.3 is a graph of the XPS wide spectrum of the sample, which reveals that the surface contained mainly Si and O.

FIG. 1.4 illustrates ap-Si suspensions under white light (left) and UV 365 nm light (right).

FIG. 1.5a illustrates a graph of BET porosimetry measurements on ap-Si.

FIG. 1.5b illustrates a graph of BET porosimetry measurements on ap-Si.

FIG. 1.6 illustrates an SEM image of etched Si wafer, before sonication, after sonication, ap-Si granules, and ap-Si after probe sonication.

FIG. 1.7 illustrates XPS valence band spectra of the sample, which shows that the sample is amorphous silicon.

FIG. 2.1 illustrates a photoluminescence Spectra of ap-Si:$H_2O_2$. FIG. 2.1 shows how PL in ap-Si was altered through the addition of $H_2O_2$, with an initial red shift and then a blue shift.

FIG. 2.2 illustrates a visible absorbance of ap-Si:$H_2O_2$. As displayed in FIG. 2.2 absorbance in this material red shifted and changed form with the greater $H_2O_2$ concentrations.

FIG. 2.3 illustrates the IR absorbance of ap-Si:$H_2O_2$. FIG. 2.3 along with Table 2 demonstrated that with the addition of greater quantities of $H_2O_2$, silicon hydride bonds become replaced with hydroxide bonding

DISCUSSION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Discussion

Embodiments of the present disclosure provide for a colloidal photoluminescent amorphous porous silicon particle suspension, methods of making a colloidal photoluminescent amorphous porous silicon particle suspension, methods of using a colloidal photoluminescent amorphous porous silicon particle suspension, and the like.

In an exemplary embodiment of the colloidal photoluminescent amorphous porous silicon particle suspension can emit energy at a specific fluorescent wavelength (e.g., toward the blue end of the spectrum as opposed to the IR end of the spectrum). In addition, the emission wavelength can be controlled by selection of the solvent used in the colloidal photoluminescent amorphous porous silicon particle suspension, surface modification, and/or doping of the photoluminescent amorphous porous silicon particle. Tuning the emission wavelength in this way is advantageous since the tuning can be conducted independent of the particle size.

Unlike other techniques, a method of making the colloidal photoluminescent amorphous porous silicon particle suspension is relatively simple and inexpensive in that ultrasonic energy can be used to form the amorphous porous silicon particles.

In an embodiment, the colloidal photoluminescent amorphous porous silicon particle suspension can be used in applications such as photovoltaic devices, LEDs, traceable drug delivery devices, sensors, lasers, lithium batteries, photonic barcodes, hydrogen production, biomaterial, cell cultures, and the like. For example, an embodiment of the photoluminescent amorphous porous silicon particle can be used as the active layer in thin-film transistors.

In an exemplary embodiment, the colloidal photoluminescent porous silicon particle suspension can include a plurality of porous silicon particles in a solvent. In an embodiment, the plurality of colloidal porous silicon particles is entirely in the amorphous phase. In an embodiment, the plurality of colloidal porous silicon particles can be partially in the amorphous phase and partially in the non-amorphous phase. In an embodiment, the colloidal porous silicon particles have a longest dimension of about 100 nanometers to 10 micrometers, about 100 nm to 1 nm, or about 100 nm to 500 nm. In an embodiment, the colloidal porous silicon particles are irregularly shaped. In an embodiment, the colloidal porous silicon particles can be sorted so that the shapes in a particular population are similar in size and/or shape. In an embodiment, the ultrasonic energy can be selected and applied for a time period to obtain porous silicon particles having a desired shape and/or diameter.

In an exemplary embodiment, the solvent is selected from: ethanol, toluene, hydrogen peroxide, water, methanol, tetrachloroethylene, acetone, alkyl acetate, hexane, decane, octane, acetonitrile, tetrahydrofuran, or a combination thereof. In an embodiment, two or more solvents can be used to tune the wavelength of the emission of the colloidal photoluminescent porous silicon particle suspension. In an embodiment, the colloidal photoluminescent porous silicon particle suspension can be stable for extended periods of time (e.g., days, weeks, months, years).

In an embodiment, when the colloidal photoluminescent porous silicon particle suspension includes ethanol as the solvent, the emission wavelength is about 523 nm to 622 nm or about 523 when the suspension is initially formed but can move to about 622 nm after a period of one month and/or after exposure to air. In an embodiment, when the colloidal photoluminescent porous silicon particle suspension includes toluene as the solvent, the emission wavelength is about 600 nm. In an embodiment, when the colloidal photoluminescent porous silicon particle suspension includes hydrogen peroxide as the solvent, the emission wavelength is about 566 nm to 595 nm or about 580 nm when the suspension is formed.

Although not intended to be bound by theory, it appears that the emission wavelength of the colloidal photoluminescent porous silicon particle suspension is a function of the ratio of OH to H on the surface of the porous silicon particles. In certain embodiments, the ratio of OH to H can be 1:0 to 5:0, about 0.1:1 to 1:0.1 or about 0:1 to 1:0, where the ratio can be adjusted by the concentration of the solvent.

In an exemplary embodiment, the method of making a colloidal photoluminescent porous silicon particle suspension can include removing a layer of porous silicon from a substrate. In an embodiment, the layer of porous silicon on the substrate can be formed using techniques such as anodization or wet chemical etching. In an embodiment, the layer of porous silicon can be modified and/or doped. In an embodiment, the thickness of the layer of porous silicon on the substrate can be about 1 to 10 μm. In an embodiment, the layer of porous silicon can be mesoporous, microporous, and/or nanoporous.

In an embodiment, a first ultrasound energy (e.g. 45 kHz frequency 60 W to 240 W peak power) can be used to form a first plurality of porous silicon particles in suspension. In an embodiment, the ultrasonic energy causes a portion of the layer of porous silicon to detach from the substrate. The size of the porous silicon particles can be about 1 μm to 10 μm. Subsequently, the substrate is removed from the first plurality of porous silicon particles (or the first plurality of porous silicon particles are removed from the substrate) and the first plurality of porous silicon particles can be subjected to one or more additional exposures to ultrasound energy (e.g. 20 kHz 50 W to 500 W frequency) to create a second plurality of porous silicon particles of reduced size compared to the first plurality, such as to the dimensions described above (e.g., about 100 nanometers to 10 micrometers). In an embodiment, the concentration of the porous silicon particles in the colloidal photoluminescent porous silicon particle suspension can be adjusted to the desired level for a particular application.

In an embodiment, the substrate, first plurality of porous silicon particles, and/or the second plurality of porous silicon particles, can be in a solution that includes the desired solvent or can be included in a different solution. When the second plurality of porous silicon particles are formed in a solution other than the desired solvent, the second plurality of porous silicon particles can be disposed in the desired solvent.

In an embodiment, the ultrasound energy can be formed using an ultrasonic horn, bath sonicator, or ultrasonic transducer. In an embodiment, the power used to detach the layer of porous silicon from the substrate is about 50 W to 500 W and is applied over a time frame of 30 seconds to 4 hours at room temperature and pressure. In an embodiment, the power used to reduce the size of the first plurality of porous silicon particles is about 60 W to 240 W and is applied over a time frame of about 1 minute to 1 hour at room temperature and pressure.

EXAMPLES

Example 1

Introduction

Transforming bulk Si into the nanometer scale results in efficient room temperature emission of visible light. One extensively studied variant of nano-scaled Si is porous Si (p-Si). Porous features are normally created in bulk Si through some type of electrochemical etching technique. Quantum confinement effects and surface effects control the electronic and optical properties of this material[1]. A great deal of work has been published on its formation[2], surface chemistry[3], structure, and photoluminescence[4].

The first reported observation of visible light-emission from anodically etched p-Si layers at room temperature was made by Canham more than two decades ago[5]. Soon after this discovery, Fathauer et al. demonstrated a non-anodic etching method (stain etching) for producing photoluminescent Si layers in which the porosity is created by etching single crystal Si in aqueous solutions of HF and $HNO_3$[6]. Since then both methods have been employed extensively to study the various physical properties of p-Si.

p-Si is an interesting material for both the viewpoints of fundamental physics and device applications. Although much is known about this material, the exact origin of light emission is still a topic of debate in the literature. It is currently being implemented in a wide array of technologies such as optoelectronics[7], sensors[8], photonic barcodes[9], cell cultures[10], drug delivery[11], biomaterials[12], hydrogen production[13], and Li battery anodes[14]. In this work, we synthesize photoluminescent amorphous porous silicon (ap-Si) suspensions, and demonstrate that surface properties determine the emission wavelength.

Synthesis

Non-anodic electrochemical etching (stain etching) of silicon is simple and relatively easy method to produce luminescent porous Si[15]. Stain etching is the result of etching from a solution composed of fluoride and an oxidant, without the use of an external current. It does not require the attachment of electrodes and can be performed on objects of arbitrary shapes and sizes. While most of the research on this system has been with the use of HF in combination with a nitroxy oxidant, commonly $HNO_3$ or $NaNO_2$, other combinations can also function as an etchant. For example, $NH_4HF_2$ can also act as a suitable fluoride source[16]. Non nitroxy oxidants, such as include $V_2O_5$, $CeF_4$, and $FeCl_3$, are suitable oxidizing as well[12]. An etchant composed of HF, HCl, and FeCl$_3$ was shown to create a highly photoluminescent porous Si which exhibited a dual layer structure, in which the top layer (~3 nm thick) was mechanically unstable [18]. We used a similar etchant formulation in our work (see experimental details). With our etching formula we also observed a dual layer structure. However they consisted of a top layer composed of nodules (10 um in diameter and 6.5 um thick) and a bottom layer (1 um thick).

We removed the top layer of porous silicon using ultrasound. A sonication bath was first used in order to remove the top layer of nodules. These nodules were further broken up using an ultrasonic horn. Suspensions of ap-Si sediment were formed within a few minutes when dispersed in toluene and in a few hours when dispersed in ethanol. Product yields were calculated to be approximately 0.3 mg ap-Si per cm$^2$ of Si wafer.

Results and Discussion

SEM micrographs, FIG. 1.1a, show that the sonicated ap-Si particles range in size between hundreds of nanometers to several microns. A HRTEM image of one ap-Si particles can be seen in FIG. 1.1b. It indicates that the ap-Si suspensions are composed of highly porous irregularly shaped structures. Selected area diffraction measurements indicated the material was composed of only an amorphous phase. This phase transformation was further verified by Raman, FIG. 1.1c, and valance band spectra. The Raman spectra exhibit phonon peaks at 150 cm$^{-1}$ and 480 cm$^{-1}$. The former is related to the transverse acoustic vibrational mode in amorphous Si, while the latter is associated with the transverse optical (TO) vibration mode[19]. M. Dudley et al. did not report any amorphous phases during their analysis of similarly etched porous silicon.[18]

BET porosimetry measurements indicate that the ap-Si has a surface area of 493 m$^2$/g with an average pore size of (3.5 nm). This large amount of surface area may be the driving force behind the crystalline to amorphous phase transition. One theory proposed by T. George et al. states that during the porous Si formation process, the crystalline Si is subdivided by the pores into small crystallites which undergo a spontaneous crystalline to amorphous phase transformation when their individual sizes fall below some critical value.[20]

The fluorescence spectrums of two samples are depicted in FIG. 1.2a. The synthesized ap-Si suspensions initially exhibited very bright orange photoluminescence. However, the emission of samples suspended in ethanol first blue shifted and then became red shifted over time, starting with 523 nm and ending at 622 nm. As the emission red shifted emission intensity decreased as well. The emission of ap-Si suspended in toluene, centered at 598 nm (dashed line, "X"), did not exhibit a shift in emission or a large decrease in intensity over time. The ethanol suspensions transitioned between an initial orange-yellow (curve denoted with a circle) to green (curve denoted with a square) and finally to a dark orange-red (curve denoted with a diamond) over the course of a few days with exposure to air.

FT-IR analysis was performed on the samples in FIG. 1.2a to determine the relationship between surface species and emission wavelength. The corresponding FT-IR absorbance spectra presented in FIG. 1.2b show that the difference in emission wavelengths is related to surface species. The main features present in the spectra are from surface hydrides, oxidized hydrides, or oxides.

Surface hydrides are represented by absorbance bands around 670 cm$^{-1}$ (deformation modes $\delta$(Si—H$_x$)), 860 cm$^{-1}$ (wagging w(Si—H$_2$)), 903 cm$^{-1}$ (deformation modes $\delta$(Si—H$_2$)), and 2100 cm$^{-1}$ (stretching modes $v_s$(Si—H$_x$)). Oxidized hydrides are represented by absorbance bands around 880 cm$^{-1}$ (deformation modes $\delta$(—O$_y$Si—H$_x$)) and 2250 cm$^{-1}$ (stretching modes $v_s$(—O$_y$Si—H$_x$)). Oxides are represented by absorbance bands around 835 cm$^{-1}$ (bending mode b(O—Si—O)) and 1070 cm$^{-1}$ (asymmetric stretching mode $v_{as}$ (Si—O—Si))[21][22] The red shift in photoluminescence emission of ap-Si dispersed in ethanol with exposure to air corresponds to a decrease in the intensity of surface hydrides and an increase in oxidized hydride and oxide species. Orange emission is shown in both toluene suspensions as well as oxidizing ethanol suspensions, suggesting that surfaces composed of mainly hydrides and ones containing oxidized hydrides can emit at the same wavelength.

An XPS survey scan of the ap-Si surface, FIG. 1.3, shows that Si and O are the primary elements detected, with only traces of C and F present on the surface (FIG. 1.3). H is beyond the detection limits of this analysis technique. It can be assumed that the photoluminescent emission must only originate from either the amorphous Si or interface states created by its oxides and hydrides. FIGS. 1.1.c and 1.7 illustrate that the emission originates from an amorphous silicon sample suspended as a colloid. FIG. 1.1b illustrates a selected area electron diffraction, which provides additional evidence that the suspension is made of amorphous silicon nanoclusters.

FIG. 1.4 illustrates ap-Si suspensions under white light (left) and UV 365 nm light (right) (from left to right is green, light yellow, dark yellow, orange, red, and yellow orange). FIG. 1.5a illustrates a graph of BET porosimetry measurements on ap-Si. FIG. 1.5b illustrates a graph of BET porosimetry measurements on ap-Si. FIG. 1.6 illustrates an SEM image of etched Si wafer, before sonication, after sonication, ap-Si granules, and ap-Si after probe sonication.

The origin of light emission from hydrogen terminated ap-Si films has been studied previously by Wehrspohn et al.[23] and Estes et al.[24]. Both groups describe the emission process as a result of spatial confinement effects rather than quantum confinement. Note that in the case of Wehrspohn the metal substrate could have affected the results. Since amorphous Si contains localized electronic states, excitons are confined spatially. The nanostructures found in ap-Si cut off these localized excitons from non-radiative recombination centers, thus allowing for the emission of photons. The band gap of conventionally produced amorphous silicon can range between 1.5 and 2 eV depending on processing conditions.[25] This should result in light emission from wavelengths greater than 620 nm. However our samples can emit at wavelengths less than this value. Silicon oxide and hydrides on the surface of the ap-Si can create a surface with a wider band gap than that of a-Si.[24] H forms new bonding states deep within the Si valence bands, with little change to the conduction bands. In doing this, local H density of states near the valance band edge erodes, effectively opening up the band gap.[26] Thus the emission at energies above that of the band gap of amorphous Si is an indication that the processes that contribute luminescence are due to surface states.

In summary, highly porous light-emitting suspensions of amorphous porous silicon have been produced via a simple synthesis method, and shown to be sensitive to surface species. To our knowledge this is the first time such a large range of light emissions have been observed amorphous porous Si. Even with little control over the particle size distribution, these suspensions exhibited highly uniform emission spectra. Through careful control of surface properties, it may be possible to tune the emission of this material. ap-Si is an interesting material system for both its fundamental physics and its range of possible applications, from optoelectronics to biomaterials.

Experimental

Synthesis:

ap-Si suspensions were prepared through etching and sonicating single crystal (100) p-type boron doped silicon (Addison Electronics) which were cleaved into 2.5×4.5 cm strips. Si strips were submerged in an etching bath composed of 7.8 g Iron (III) Chloride hexahydrate (97%, Acros Organics) dissolved in a mixture of 18 ml 32%/vol hydrochloric acid (Fischer Scientific) and 42 ml 49%/vol hydrofluoric acid (Fluka). Si strips were submerged in etching bath for 20 hours, after which their surface became matte black. (yellow/white/green crystalline precipitates form during reaction) Etched strips were then cleaned by rinsing in deionized water (Millipore) followed by absolute ethanol (Sigma Aldrich), then dried under nitrogen stream. After drying a yellow film formed on the surface.

Etched strips were submerged in a solvent, either ethanol or lab grade toluene (Fischer Sci.) and sonicated using a (VWR Ultrasonic Cleaner) sonicating bath for 30 min. Si strips were then removed and the solution containing the now ap-Si suspensions were further sonicated using a (QSonica Q500 ultrasonic processor) for 30 min. Solutions in ethanol were degassed for 20 min using a degassing station (TA Instruments) and sealed under nitrogen. Resulting solutions were a cloudy orange-yellow mixture Analysis Techniques:

HRTEM images were recorded on a (FEI Krios CT transmission electron microscope) at an operating voltage of (120 kV). Raman spectra were obtained using a (Horiba) Raman spectrometer employing a 473 nm cobalt laser beam λexc=473 nm Laser power density=0.6 mW. Fluorescence spectra were determined on a Horiba Fluoromax-4 Spectrofluorometer. FIG. 2.1 is a typical emission spectra of the amorphous nanoclusters as a function of the quantity of oxygen added.

FTIR spectra were recorded using a (Thermo Nicolet iS10) FT-IR spectrometer from (500 to 2500) $cm^{-1}$. Samples were prepared for FT-IR measurements by drying suspensions in KBr salts and pressing them into pellets. FIG. 2.3 shows the appearance of a Si—O peak when the nanoclusters are exposed to peroxide.

References, each of which is incorporated herein by reference

[1] Y. Kanemitsu, *Physics Reports* 1995, 263, 1-91.
[2] G. Korotcenkov, B. K. Cho, *Critical Reviews in Solid State and Materials Sciences* 2010, 35, 153-260.
[3] T. Young, C. Chen, J. Liou, Y. Yang, T. Chang, *Journal of Porous Materials* 2000, 7, 339-343.
[4] A. Cullis, L. T. Canham, P. D. J. Calcott, *Applied Physics Reviews* 1997, 82, 909-965.
[5] L. T. Canham, *Applied Physics Letters* 1990, 57, 1046.
[6] R. Fathauer, T. George, A. Ksendzov, R. Vasquez, *Applied Physics Letters* 1992, 60, 995-997.
[7] L. Canham, *Nature* 2000, 408, 411-2.
[8] a. M. Rossi, H. G. Bohn, *Physica Status Solidi* (a) 2005, 202, 1644-1647.
[9] F. Ramiro-Manzano, R. Fenollosa, E. Xifré-Pérez, M. Garin, F. Meseguer, *Advanced Materials* (Deerfield Beach, Fla.) 2011, 3022-3025.
[10] S. B.-T. de-Leon, R. Oren, M. E. Spira, N. Korbakov, S. Yitzchaik, a. Sa'ar, *Physica Status Solidi* (a) 2005, 202, 1456-1461.
[11] J. Salonen, J. Paski, K. Vähä-Heikkilä, T. Heikkilä, M. Björkqvist, V.-P. Lehto, *Physica Status Solidi* (a) 2005, 202, 1629-1633.
[12] J. L. Coffer, M. a. Whitehead, D. K. Nagesha, P. Mukherjee, G. Akkaraju, M. Totolici, R. S. Sallie, L. T. Canham, *Physica Status Solidi* (a) 2005, 202, 1451-1455.
[13] S. Litvinenko, S. Alekseev, V. Lysenko, a. Venturello, F. Geobaldo, L. Gulina, G. Kuznetsov, V. Tolstoy, V. Skryshevsky, E. Garrone, *International Journal of Hydrogen Energy* 2010, 35, 6773-6778.
[14] H.-C. Shin, J. a. Corno, J. L. Gole, M. Liu, *Journal of Power Sources* 2005, 139, 314-320.
[15] K. W. Kolasinski, *Current Opinion in Solid State and Materials Science* 2005, 9, 73-83.
[16] M. Nahidi, K. W. Kolasinski, *Journal of The Electrochemical Society* 2006, 153, C19.
[17] M. E. Dudley, K. W. Kolasinski, *Electrochemical and Solid-State Letters* 2009, 12, D22.
[18] M. E. Dudley, K. W. Kolasinski, *Physica Status Solidi* (a) 2009, 206, 1240-1244.
[19] J. M. Perez, J. Villalobos, P. McNeill, J. Prasad, R. Cheek, J. Kelber, J. P. Estrera, P. D. Stevens, R. Glosser, *Applied Physics Letters* 1992, 61, 563.
[20] T. George, R. Vasquez, S. Kim, R. W. Fathauer, W. Pike, in *MRS Proceedings*, Cambridge Univ Press 1992, 415-420.
[21] M. Vasquez-a., G. Garcia-Salgado, G. Romero-Paredes, R. Pena-Sierra, 2006 *3rd International Conference on Electrical and Electronics Engineering* 2006, 53, 1-4.
[22] D. B. Mawhinney, J. A. Glass Jr, J. T. Yates Jr, *The Journal of Physical Chemistry B* 1997, 101, 1202-1206.
[23] R. B. Wehrspohn, J.-N. Chazalviel, F. Ozanam, I. Solomon, *The European Physical Journal B* 1999, 8, 179-193.
[24] M. Estes, G. Moddel, *Physical Review. B, Condensed Matter* 1996, 54, 14633-14642.
[25] W. Futako, T. Kamiya, C. M. Fortmann, I. Shimizu, *Journal of Non-crystalline Solids* 2000, 266, 630-634.
[26] D. Wolford, B. Scott, J. Reimer, J. Bradley, *Physica B: Condensed Matter* 1983, 117, 920-922.
[27] R. Vink, G. Barkema, W. van der Weg, *Physical Review B* 2001, 63, 1-6.
[28] R. P. Vasquez, R. W. Fathauer, T. George, A. Ksendzov, T. L. Lin, *Applied Physics Letters* 1992, 60, 1004.

Example 2

Color Tuning Amorphous Porous Silicon with Hydrogen Peroxide

Experimental

1. Amorphous porous silicon (ap-Si) synthesized and dispersed in ethanol as previously described
2. The ap-Si sample was separated into five 5 ml portions
3. Hydrogen peroxide ($H_2O_2$) was added to these solutions with amounts/volume % given in table 1, and stirred for 4 hours.

TABLE 1

Example 2: Reaction conditions for ap-Si:$H_2O_2$

| Ref F020 | ap-Si (ml) | $H_2O_2$ (ml) | % $H_2O_2$ |
|---|---|---|---|
| 0 | 5 | 0 | 0 |
| 1 | 5 | .02 | .398 |
| 2 | 5 | .06 | 1.186 |
| 3 | 5 | .18 | 3.475 |
| 4 | 5 | .72 | 12.587 |

1. Photoluminescence (PL), visible absorbance, and IR absorbance were measured for each sample Results:

2. FIG. 2.1 illustrates a photoluminescence Spectra of ap-Si: $H_2O_2$. FIG. 2.1 shows how PL in ap-Si was altered through the addition of $H_2O_2$, with an initial red shift and then a blue shift
3. FIG. 2.2 illustrates a visible absorbance of ap-Si:$H_2O_2$. As displayed in FIG. 2.2 absorbance in this material red shifted and changed form with the greater $H_2O_2$ concentrations
4. FIG. 2.3 illustrates the IR absorbance of ap-Si:$H_2O_2$. FIG. 2.3 along with table 2 demonstrated that with the addition of greater quantities of $H_2O_2$, silicon hydride bonds become replaced with hydroxide bonding
5. Table 3 summarizes the results of this experiments in terms of changes in peak position and values for full width at half maximums (FWHM)

Summary:

Light emission in ap-Si can be tuned through the replacement of hydride surfaces with that of OH ligands by the addition of $H_2O_2$.

TABLE 2

Example 2: Chemical species associated with IR band positions

| Band Position (cm$^{-1}$) | Associated Species |
|---|---|
| 790 | deformation modes $\delta(Si-H_x)$ |
| 835 | bending mode $b(O-Si-O)$ |
| 860 | wagging $w(Si-H_2)$ |
| 880 | deformation modes $\delta(-O_ySi-H_x)$ |
| 903 | deformation modes $\delta(Si-H_2)$ |
| 950 | Bending (SiOH) |
| 1070 | asymmetric stretching mode $v_{as}$ (Si-O-Si) |
| 2100 | stretching modes $v_s(Si-H_x)$ |
| 2250 | stretching modes $v_s(-O_ySi-H_x)$ |
| 3600 | Stretching modes (SiOH) |

TABLE 3

Example 2: Summary of results for ap-Si: $H_2O_2$

| Ref F020 | ap-Si (ml) | $H_2O_2$ (ml) | % $H_2O_2$ | Peak (nm) | Δ (nm) | FWHM (nm) |
|---|---|---|---|---|---|---|
| 0 | 5 | 0 | 0 | 580 | 0 | 108 |
| 1 | 5 | .02 | .398 | 595 | +15 | 105 |
| 2 | 5 | .06 | 1.186 | 589 | +9 | 108 |
| 3 | 5 | .18 | 3.475 | 582 | +2 | 110 |
| 4 | 5 | .72 | 12.587 | 566 | -14 | 102 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'". When a range includes "zero" and is modified by "about" (e.g., about one to zero or about zero to one), about zero can include, 0, 0.1. 0.01, or 0.001.

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method of making a colloidal suspension of photoluminescent porous silicon particles, comprising:
   removing a layer of porous silicon from a substrate using a first ultrasound energy to form a first plurality of porous silicon particles as a colloidal suspension; and
   exposing the colloidal suspension of the first plurality of porous silicon particles to a second ultrasound energy to reduce the size of the first plurality of porous silicon particles, thereby forming a second plurality of porous silicon particles as a colloidal suspension, wherein the second plurality of porous silicon particles are in the amorphous phase.

2. The method of claim 1, wherein the second plurality of porous silicon particles have a longest dimension of about 100 nanometers to 10 micrometers.

3. The method of claim 1, wherein the second plurality of porous silicon particles are irregularly shaped.

4. The method of claim 1, wherein the second plurality of porous silicon particles are suspended in a solvent selected from the group consisting of: ethanol, toluene, hydrogen peroxide, water, THF, isopropylene, octane, an alkane solvent, and a combination thereof.

5. The method of claim 1, wherein the second plurality of porous silicon particles is suspended in ethanol and has an emission of about 523 nm just after formation of the suspension.

6. The method of claim 1, wherein the second plurality of porous silicon particles is suspended in ethanol and has an emission of about 622 nm after about one month.

7. The method of claim 1, wherein the second plurality of porous silicon particles is suspended in toluene and has an emission of about 598 nm just after formation of the suspension.

8. A method of making a colloidal suspension of photoluminescent porous silicon particles, comprising:
   removing a layer of porous silicon from a substrate using a first ultrasound energy to form a first plurality of porous silicon particles as a colloidal suspension; and
   exposing the first plurality of porous silicon particles as the colloidal suspension to a second ultrasound energy to reduce the size of the first plurality of porous silicon particles as the colloidal suspension, thereby forming a second plurality of porous silicon particles as a colloidal suspension, wherein the second plurality of porous silicon particles are in the amorphous phase, wherein the second plurality of porous silicon particles is suspended in hydrogen peroxide and has an emission of about 595 nm to 566 nm.

9. A colloidal suspension of photoluminescent porous silicon particle suspension comprising:
a plurality of porous silicon particles in a solvent as a colloidal suspension, and wherein the plurality of porous silicon particles is in the amorphous phase, wherein the plurality of porous silicon particles is suspended in hydrogen peroxide and has an emission of about 595 nm to 566 nm.

10. A colloidal suspension of photoluminescent porous silicon particle suspension comprising:
a plurality of porous silicon particles in a solvent as a colloidal suspension, and wherein the plurality of porous silicon particles is in the amorphous phase, wherein the porous silicon particles have a ratio of OH to H on the surface of the colloidal porous silicon particles of about 0:1 to about 1:0.

11. The method of claim 1, further comprising:
tuning an emission wavelength of the second plurality of porous silicon particles as the colloidal suspension by
a solvent used in the colloidal suspension,
a ratio of OH to H on a surface the second plurality of porous silicon particles by adjusting a concentration of the solvent used in the colloidal suspension,
combining two solvents used in the colloidal suspension,
modifying a surface of the second plurality of porous silicon particles, or
doping of the second plurality of porous silicon particles.

* * * * *